US012774432B2

(12) United States Patent
Dezelah et al.

(10) Patent No.: US 12,774,432 B2
(45) Date of Patent: Oct. 27, 2026

(54) METHOD FOR SELECTIVELY REMOVING OXIDE FROM A SURFACE

(71) Applicant: ASM IP Holding B.V., Almere (NL)

(72) Inventors: Charles Dezelah, Helsinki (FI); Fei Wang, Phoenix, AZ (US); Robin Scott, Phoenix, AZ (US); Woo Jung Shin, Chandler, AZ (US); Amin Azimi, Phoenix, AZ (US)

(73) Assignee: ASM IP Holding B.V., Almere (NL)

( * ) Notice: Subject to any disclaimer, the term of this patent is extended or adjusted under 35 U.S.C. 154(b) by 908 days.

(21) Appl. No.: 17/991,044

(22) Filed: Nov. 21, 2022

(65) Prior Publication Data

US 2023/0159865 A1 May 25, 2023

Related U.S. Application Data

(60) Provisional application No. 63/282,809, filed on Nov. 24, 2021.

(51) Int. Cl.

| | |
|---|---|
| ***C11D 7/32*** | (2006.01) |
| ***C11D 7/04*** | (2006.01) |
| ***C11D 7/34*** | (2006.01) |

(52) U.S. Cl.

CPC .............. *C11D 7/3209* (2013.01); *C11D 7/04* (2013.01); *C11D 7/34* (2013.01); *C11D 2111/20* (2024.01)

(58) Field of Classification Search

CPC ......... H01L 21/31116; H01L 21/30604; H10P 50/283

See application file for complete search history.

(56) References Cited

U.S. PATENT DOCUMENTS

| | | | | |
|---|---|---|---|---|
| 8,026,201 | B2 | 9/2011 | Zhang et al. | |
| 8,241,831 | B2 | 8/2012 | Jung | |
| 8,697,829 | B2 | 4/2014 | Saxena | |
| 11,101,499 | B2 | 8/2021 | Itabashi | |
| 11,315,794 | B2 | 4/2022 | Wang et al. | |
| 2004/0197474 | A1 | 10/2004 | Vrtis | |
| 2004/0204596 | A1 | 10/2004 | Potier | |
| 2009/0082581 | A1 | 3/2009 | Pugin | |
| 2010/0113818 | A1 | 5/2010 | Oh | |
| 2010/0174042 | A1 | 7/2010 | Yamakawa | |
| 2017/0204124 | A1 | 7/2017 | Takahashi | |
| 2018/0166255 | A1* | 6/2018 | Blomberg | C23F 4/02 |
| 2018/0182597 | A1* | 6/2018 | Blomberg | C23G 5/00 |
| 2018/0247832 | A1* | 8/2018 | Fischer | H01L 21/0206 |
| 2018/0327400 | A1 | 11/2018 | Schimperna | |

OTHER PUBLICATIONS

Hayashi et al. ("2,2~Difluoroe-1,3-dimethylimidazolidine (DFD. A new fluorinating agent", The Royal Society of Chemistry, ChemComm, 2002, 1018-1019), 2002—Provided by Applicant.*

(Continued)

*Primary Examiner* — Thomas T Pham

(74) *Attorney, Agent, or Firm* — Snell & Wilmer L.L.P.

(57) ABSTRACT

A method of cleaning (e.g., selectively removing an oxide from) a surface of a substrate is disclosed. An exemplary method includes providing one or more of a haloalkylamine and a halogenated sulfur compound to a reaction chamber to selectively remove the silicon oxide from the surface.

17 Claims, 4 Drawing Sheets

(56) References Cited

OTHER PUBLICATIONS

Figure 1:
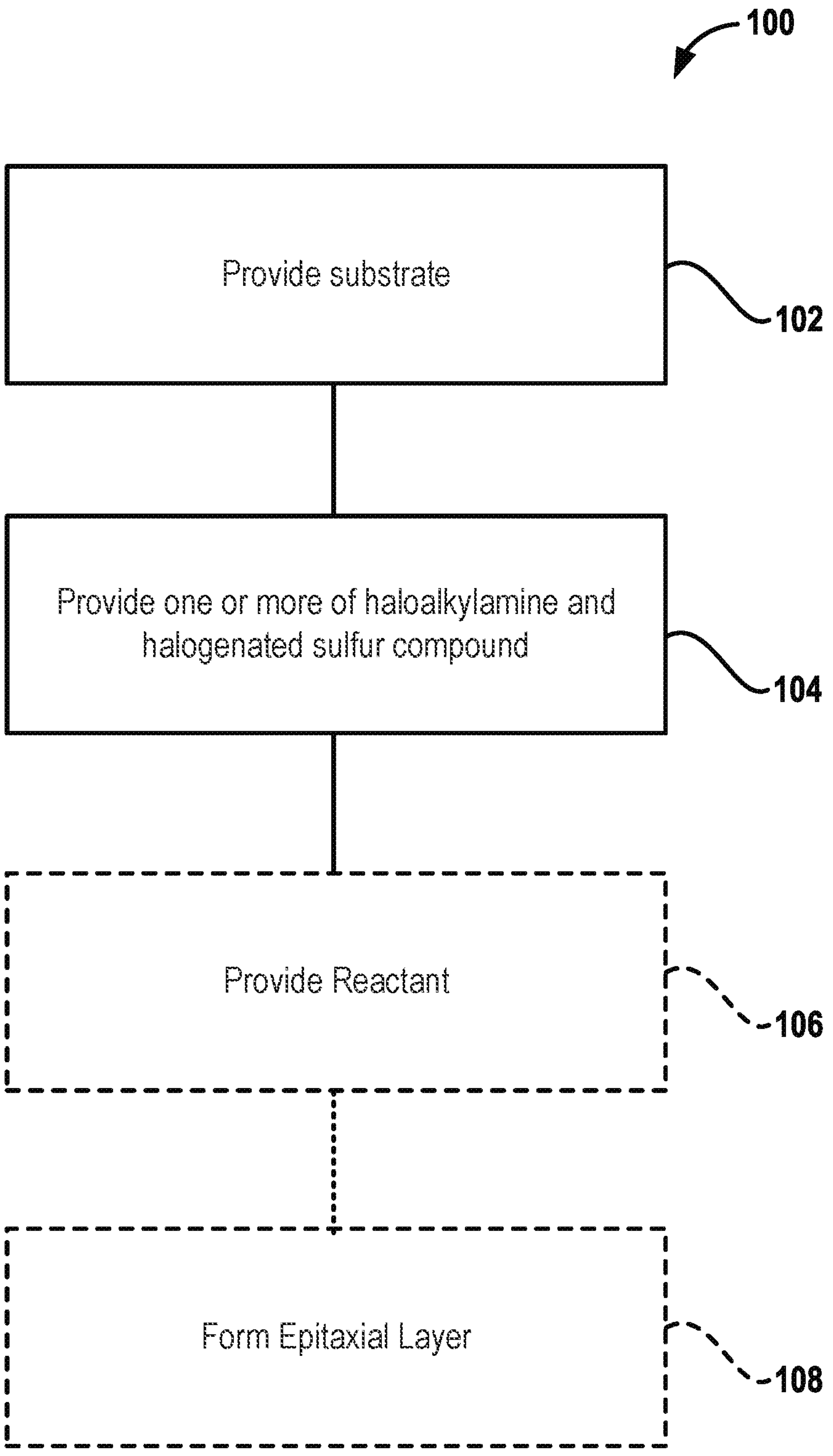

Gertsch, Jonas C. et al., "SF4 as the Fluorination Reactant for Al2O3 and VO2 Thermal Atomic Layer Etching," Chem. Mater. 2019,31, 3624-3635.
Takaoka, Akio et al., "F-Propene-Dialkylamine Reaction Products as Fluorinating Agents," Bulletin of the Chemical Society of Japan, vol. 52 (11), 3377-3380, Nov. 1979.
Hayashi, Hidetoshi et al., "2,2-Difluoro-1,3-dimethylimidazolidine (DFI). A new fluorinating agent," Chem. Commun. 2002, 1618-1619.

* cited by examiner

METHOD FOR SELECTIVELY REMOVING OXIDE FROM A SURFACE

CROSS-REFERENCE TO RELATED APPLICATIONS

This application is a nonprovisional of, and claims priority to and the benefit of, U.S. Provisional Patent Application No. 63/282,809, filed Nov. 24, 2021 and entitled "METHOD FOR SELECTIVELY REMOVING OXIDE FROM A SURFACE," which is hereby incorporated by reference herein.

FIELD OF THE DISCLOSURE

The present disclosure generally relates to methods suitable for use in the manufacture of electronic devices. More particularly, the disclosure relates to methods of removing an oxide from a surface.

BACKGROUND OF THE DISCLOSURE

Gas-phase reactors, such as chemical vapor deposition (CVD) reactors, can be used for a variety of applications, including depositing and etching materials on a substrate surface. For example, gas-phase reactors can be used to deposit epitaxial layers on a substrate to form semiconductor devices, flat panel display devices, photovoltaic devices, microelectromechanical systems (MEMS), and the like.

During an epitaxial deposition process, a layer of epitaxial material is deposited onto or grows on a surface of a substrate. Various properties of the epitaxial material are often dependent on properties (e.g., composition, defects, or the like) of the underlying surface. A surface clean, or epi pre-clean, is often employed to provide a suitable starting surface to facilitate epitaxial growth of material with the desired properties.

Typical epi pre-clean processes often include use of plasma generated species to remove material from the surface. In many applications, use of a plasma may not be desirable, because use of plasma often results in non-uniform material removal rates, particularly over high aspect ratio features on the surface. As a result, methods to clean a surface prior to epitaxial deposition that do not employ a plasma have been investigated. Such non-plasma methods often include use of hydrogen fluoride (HF) or molecules that generate or are chemically similar to HF. These approaches, however, lead to significant environmental, health, and safety concerns, due to inherent hazards associated with HF use. Additionally, such methods typically require a co-reactant or catalyst, such as ammonia ($NH_3$), which can leave a residue on the surface; such residue can deleteriously interfere with subsequent processing steps. Other challenges exist with methods that use HF, such as insufficient selectivity of the etch and volume expansion of some exposed surface materials. Accordingly, improved methods of selectively cleaning a surface of a substrate are desired.

Any discussion, including discussion of problems and solutions, set forth in this section has been included in this disclosure solely for the purpose of providing a context for the present disclosure. Such discussion should not be taken as an admission that any or all of the information was known at the time the invention was made or otherwise constitutes prior art.

SUMMARY OF THE DISCLOSURE

This summary may introduce a selection of concepts in a simplified form, which may be described in further detail below. This summary is not intended to necessarily identify key features or essential features of the claimed subject matter, nor is it intended to necessarily limit the scope of the claimed subject matter.

Various embodiments of the present disclosure relate to improved methods for cleaning a surface of a substrate. Exemplary methods are particularly well suited for cleaning the surface prior to epitaxial deposition. While the ways in which various embodiments of the present disclosure address drawbacks of prior methods are discussed in more detail below, in general, various embodiments of the disclosure provide methods that can be used to selectively remove material, such as oxides (e.g., silicon oxide) from a surface of a substrate.

In accordance with exemplary embodiments of the disclosure, a method for selectively removing silicon oxide from a surface of a substrate is provided. The method includes providing a substrate within a reaction chamber of a reactor system, the substrate comprising a surface comprising silicon oxide, and providing one or more of a haloalkylamine and a halogenated sulfur compound to the reaction chamber to selectively remove the silicon oxide from the surface. In accordance with various examples of these embodiments, the haloalkylamine comprises an α-fluoroalkylamine. The α-fluoroalkylamine can include a compound containing at least one carbon atom bonded to both a nitrogen atom and a fluorine atom. In accordance with further examples, the α-fluoroalkylamine comprises a compound represented by $R_2NCF_2R'$, wherein each R is independently selected from a C1-C6 hydrocarbon and R' is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof, and an $—NR''_2$ group, where R" can be selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof and an $—NR'''_2$ group, where R''' can be selected from a C1-C6 hydrocarbon. In accordance with examples of these embodiments, one or more of R and R' can be or include a cyclic group. In accordance with further examples, the haloalkylamine is represented by the formula:

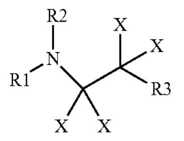

wherein R1 and R2 are each an independently selected C1 to C6 alkyl group or a fluorinated C1 to C6 alkyl group containing one or more fluorine atoms, and wherein R3 is selected from H, F, Cl, a C1-C6 alkyl, or a fluorinated C1-C6 alkyl containing one or more fluorine atoms. In some cases, at least one X is F. In some cases, each X is F.

In accordance with additional examples of the disclosure, the halogenated sulfur compound comprises a compound represented by the formula $S_aX_b$ where S is sulfur and each X is independently one of F, Cl, Br, or I, where a is a value from 1 to 3, and where b is a value from 2 to 14, it being understood that b is selected based on a—i.e., b is selected to be within an acceptable range based on the value of a. In some cases, at least one X is F. In some cases, each X is F. In accordance with further examples of the disclosure, the halogenated sulfur compound is represented by the formula $S_aX_bO_c$, where S is sulfur, where O is oxygen, where X is independently F, Cl, Br, I, OH, or an alkyl group containing 1-6 carbon atoms, wherein at least one X is a halogen atom, where a is a value between 1 and 3, b is a value between 2 and 12, and c is a value between 1 and 8, it being understood that b and c are based on a—i.e., b and c can be selected to be within a workable range based on a; c can be selected to be within a workable range based on a and b. As above, in some cases, at least one X is F. In some cases, each X is F.

In accordance with further examples of the disclosure, the method can further include a step of providing a reactant to the reaction chamber. The reactant can be or include, for example, one or more of the group consisting of water; a C1-C6 alcohol; ammonia; a C1-C6 primary, a secondary, or tertiary amine; a C1-C6 carboxylic acid; and a C1-C6 alkyl hydrazine.

These and other embodiments will become readily apparent to those skilled in the art from the following detailed description of certain embodiments having reference to the attached figures. The invention is not limited to any particular embodiments disclosed.

BRIEF DESCRIPTION OF THE DRAWING FIGURES

A more complete understanding of exemplary embodiments of the present disclosure can be derived by referring to the detailed description and claims when considered in connection with the following illustrative figures.

FIG. 1 illustrates a method in accordance with at least one exemplary embodiment of the present disclosure.

Figure 2:
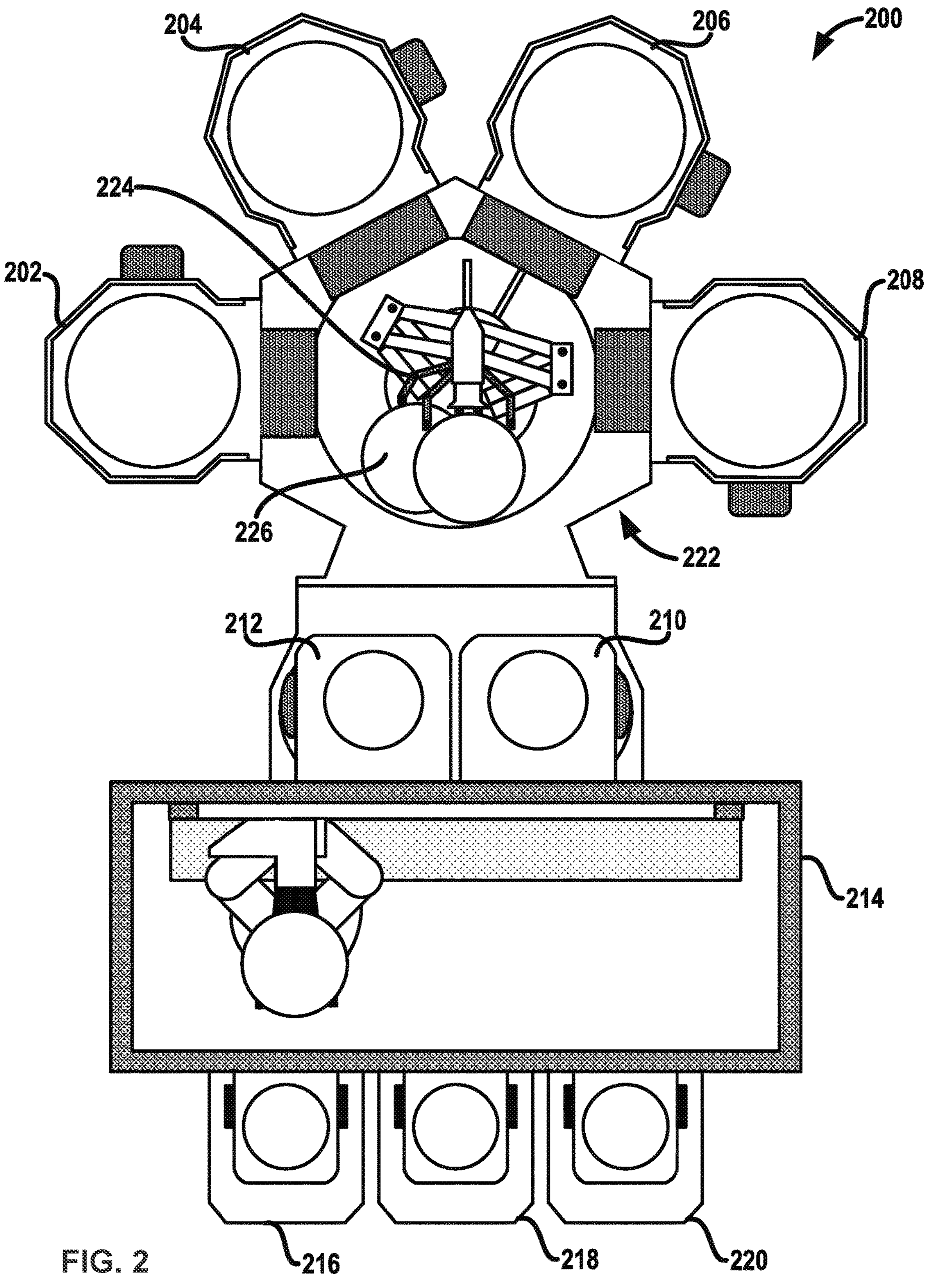

FIG. 2 schematically illustrates a system for use with a method described herein.

Figure 3:
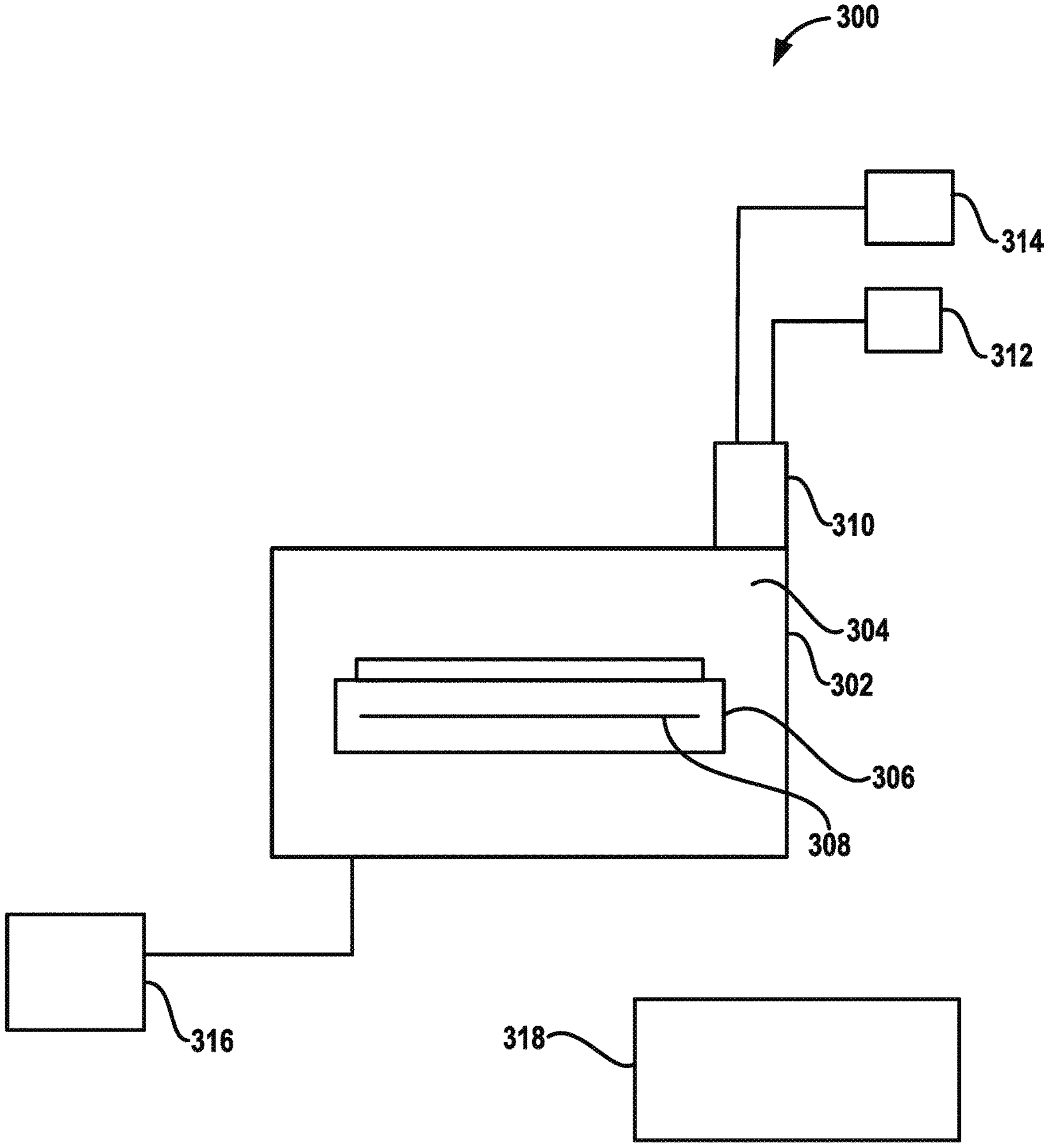

FIG. 3 schematically illustrates a portion of a system in accordance with examples of the disclosure.

Figure 4:
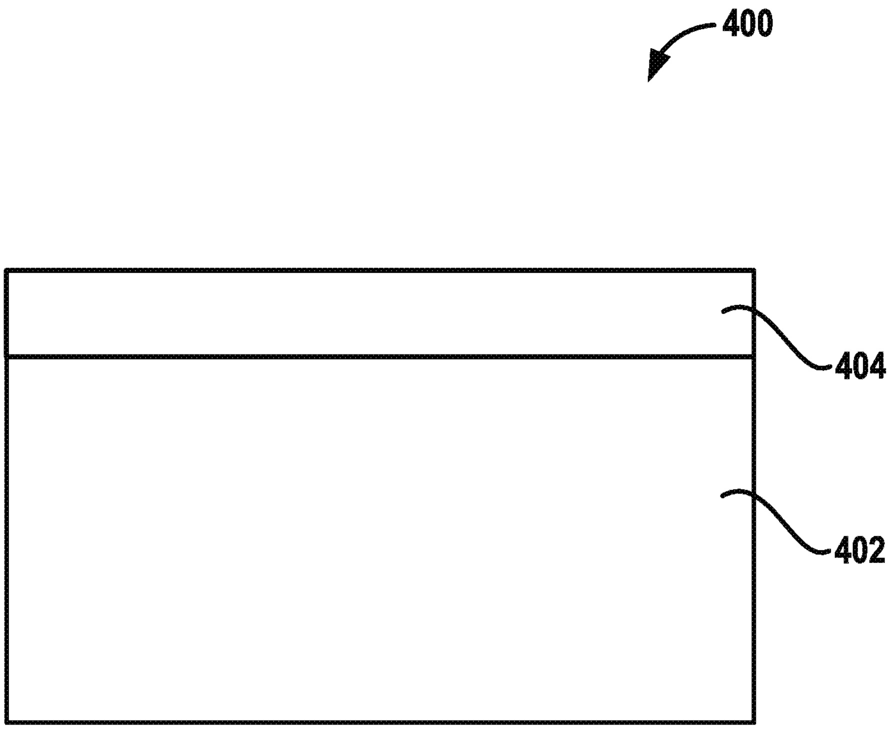

FIG. 4 illustrates a structure formed in accordance with at least one exemplary embodiment of the disclosure.

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

The present disclosure generally relates to methods and systems for cleaning surfaces prior to depositing epitaxial material. Exemplary methods and systems can be used to process substrates, such as semiconductor wafers, during the manufacture of devices, such as semiconductor devices, flat panel display devices, photovoltaic devices, microelectromechanical systems (MEMS), and the like. By way of examples, exemplary systems and methods described herein can be used to clean a surface and to form or grow epitaxial layers (e.g., one component, two component and/or doped semiconductor layers) on a surface of a substrate.

As used herein, the terms "precursor" and/or "reactant" can refer to one or more gases/vapors that take part in a chemical reaction or from which a gas-phase substance that takes part in a reaction is derived. The chemical reaction can take place in the gas phase and/or between a gas phase and a surface (e.g., of a surface of a substrate) and/or a species on the surface.

As used herein, a "substrate" refers to any material having a surface onto which material can be deposited. A substrate may include a bulk material such as a Group IV (e.g., silicon, such as single crystal silicon) or other semiconductor material, such as Group III-V or Group II-VI semiconductor material, or may include one or more layers overlying the bulk material. Further, the substrate may include various topologies, such as trenches, vias, lines, and the like formed within or on at least a portion of a layer of the substrate. In accordance with examples of the disclosure, a substrate includes a surface that includes crystalline semiconductor material and/or an oxide formed thereon.

In this disclosure, "gas" can include material that is a gas at normal temperature and pressure (NTP), a vaporized solid and/or a vaporized liquid, and can be constituted by a single gas or a mixture of gases, depending on the context. A gas other than the process gas, i.e., a gas introduced without passing through a gas distribution assembly, other gas distribution device, or the like, can be used for, e.g., sealing the reaction space, and can include a seal gas, such as a rare gas.

The term "inert gas" can refer to a gas that does not take part in a chemical reaction and/or does not become a part of a film matrix to an appreciable extent. Exemplary inert gases include helium, argon, nitrogen, and any combination thereof. A carrier can be or include an inert gas.

As used herein, the term "film" and/or "layer" can refer to any continuous or non-continuous structure and material, such as material deposited by the methods disclosed herein. For example, film and/or layer can include two-dimensional materials, three-dimensional materials, nanoparticles or even partial or full molecular layers or partial or full atomic layers or clusters of atoms and/or molecules. A film or layer may comprise material or a layer with pinholes, which may be at least partially continuous.

As used herein, a "structure" can be or include a substrate as described herein. Structures can include one or more layers overlying the substrate, such as one or more layers formed according to a method as described herein. Device portions can be or include structures.

As used herein, the term "epitaxial layer" can refer to a substantially single crystalline layer upon an underlying substantially single crystalline substrate or layer.

As used herein, the term "chemical vapor deposition" can refer to any process wherein a substrate is exposed to one or more gas-phase precursors, which react and/or decompose on a substrate surface to produce a desired deposition.

Further, in this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" refer independently to "typically or broadly comprising," "comprising," "consisting essentially of," or "consisting of" in some embodiments. In this disclosure, any defined meanings do not necessarily exclude ordinary and customary meanings in some embodiments.

Turning now to the figures, FIG. 1 illustrates an exemplary method 100 in accordance with examples of the disclosure. Method 100 can be used to selectively remove silicon oxide from a surface of a substrate and optionally deposit an epitaxial material layer—e.g., during formation of a device structure.

In the illustrated example, method 100 includes providing a substrate within a reaction chamber of a reactor system (step 102), providing one or more of a haloalkylamine and a halogenated sulfur compound to the reaction chamber (step 104), optionally providing a reactant to the reaction chamber (step 106), and optionally forming an epitaxial layer (step 108). In accordance with examples of the disclosure, steps 102-108 can be thermal—i.e., steps 102-108 can be performed without use of excited species formed using a plasma.

During step 102, a substrate is provided within a reaction chamber of a reactor system. The substrate can include a surface comprising, for example, silicon oxide.

During step 102, the reaction chamber can be brought to a desired temperature and/or pressure for subsequent processing. While the temperature and pressure can vary according to precursors/reactants used during step 104, in general, a temperature within the reaction chamber (e.g., of a substrate support and/or reaction chamber wall) can be less than 200° C., less than 150° C., less than 100° C., or less than 50° C. and/or greater than 25° C. or greater than 40° C.; the pressure within the reaction chamber can be between about 10 mTorr and about 760 Torr or between about 0.5 and about 100 Torr or between about 0.5 and about 50 Torr.

To clean or remove an oxide from the surface of the substrate, one or more precursors and/or reactants are provided to the reaction chamber during step 104. The precursors/reactants can be provided to selectively remove the silicon oxide from the surface. In accordance with examples of the disclosure, one or more of a haloalkylamine and a halogenated sulfur compound are provided to the reaction chamber during step 104.

In accordance with examples of the disclosure, the haloalkylamine can be or include an α-fluoroalkylamine. The α-fluoroalkylamine, in turn, can be or include a compound containing at least one carbon atom bonded to both a nitrogen atom and a fluorine atom.

Particular α-fluoroalkylamines suitable for use with step 104 include compounds represented by $R_2NCF_2R'$, wherein each R is independently selected from a C1-C6 hydrocarbon and R' is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof, and an $—NR''_2$ group, where R" can be selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof, and an $—NR'''_2$ group, where R'" can be selected from a C1-C6 hydrocarbon. In accordance with various examples, one or more of R and R' comprises a cyclic group. The cyclic group can include an $NCF_2$ fragment of the α-fluoroalkylamine. By way of particular examples, the α-fluoroalkylamine can be 1,1,2,2,-tetrafluoroethyl-N,N-dimethylamine; 2,2-difluoro-1,3-dimethylimidazolidine; N,N-diethyl-1,1,2,3,3,3-hexafluoro-1-propanamine; N,N-Diethyl-1,1,2,3,3,3-hexafluoro-1-propanamine; or 2-chloro-N,N-diethyl-1,1,2-trifluoroethanamine.

In accordance with additional examples, the haloalkylamine is represented by the formula

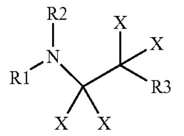

wherein R1 and R2 are each an independently selected C1 to C6 alkyl group or a fluorinated C1 to C6 alkyl group containing one or more fluorine atoms, and wherein R3 is selected from H, F, Cl, a C1-C6 alkyl, or a fluorinated C1-C6 alkyl containing one or more fluorine atoms. In accordance with examples of these embodiments, at least one X is F. In some cases, each X is F.

As noted above, a halogenated sulfur compound can be used during step 104. Exemplary halogenated sulfur compounds include compounds represented by the formula $S_aX_b$ where S is sulfur and each X is independently one of F, Cl, Br, or I, where a is a value from 1 to 3, and where b is a value from 2 to 14, it being understood that b is selected to be within a workable range based on the value of a. In accordance with examples of the disclosure, at least one X is F; in some cases, each X is F.

In some cases, the halogenated sulfur compound includes sulfur, oxygen, and one or more halogens. In accordance with aspects of these embodiments, the halogenated sulfur compound can be represented by the formula $S_aX_bO_c$, where S is sulfur, where O is oxygen, where X is independently F, Cl, Br, I, OH, or an alkyl group containing 1-6 carbon atoms, wherein at least one X is a halogen atom, where a is a value between 1 and 3, b is a value between 2 and 12, and c is a value between 1 and 8, it being understood that values of b and c are based on workable ranges based on the value of a. In some cases, at least one X is F. In some cases, each X is F.

By way of specific examples, the halogenated sulfur compound includes one or more of the group consisting of the following.

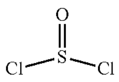 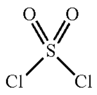 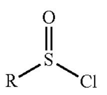

where R is a C1-C6 alkyl group

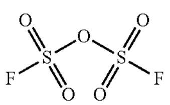 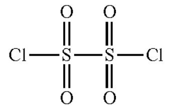

The haloalkylamines and halogenated sulfur compounds can be provided to the reaction chamber alone or in combination with a carrier gas. A carrier gas can be or include an inert gas. In some cases, the carrier gas can be or include, for example, a noble gas, such as argon and/or helium, and/or other gas, such as nitrogen, or the like.

As illustrated in FIG. 1, in some cases, method 100 includes providing a reactant to the reaction chamber (step 106). Exemplary reactants include one or more compounds of the group consisting of water; a C1-C6 alcohol; ammonia; a C1-C6 primary, a secondary, or tertiary amine; a C1-C6 carboxylic acid; and a C1-C6 alkyl hydrazine. In some cases, steps 104 and 106 can overlap. For example, the step of providing the one or more of a haloalkylamine and the halogenated sulfur compound and the step of providing the reactant to the reaction chamber can overlap for at least a portion of step 104 and/or 106. Additionally or alternatively, in some cases, the step of providing the one or more of a haloalkylamine and the halogenated sulfur compound and the step of providing the reactant to the reaction chamber alternate and/or are cyclic.

Method 100 can also include a step of forming an epitaxial layer (step 108). Step 108 can include providing a precursor and optionally a reactant to the reaction chamber or to another reaction chamber—e.g., another reaction chamber in the same reactor system.

Exemplary precursors for use during step 108 include halides, such as silicon halides. In some embodiments, the silicon halide compound can include, for example, a silicon halide having the general formula given as: $Si_xW_yH_z$, wherein "W" is a halide selected from the group consisting of Fluorine (F), Chlorine (Cl), Bromine (Br), and Iodine (I), "x" is an integer greater than zero and less than or equal to four, and "y" and "z" are integers greater than or equal to zero whose sum is equal to or greater than four and equal to or less than 10 (or, more simply $0<x\leq4$ and $y\geq0$ and $z\geq0$, where $x+y\leq10$). In some embodiments, the silicon halide precursor may be selected from the group consisting of silicon fluorides (e.g., $SiF_4$), silicon chlorides (e.g., $SiCl_4$), silicon bromides (e.g., $SiBr_4$), and silicon iodides (e.g., $SiI_4$). In some embodiments, the silicon halide precursor may comprise silicon tetrachloride ($SiCl_4$).

In some embodiments, the precursor may comprise a silane, such as, for example, silane ($SiH_4$), disilane ($Si_2H_6$), trisilane ($Si_3H_8$), tetrasilane ($Si_4H_{10}$) or higher order silanes with the general empirical formula $Si_xH_{(2x+2)}$.

By way of examples, the precursor can be or include one or more of silicon tetrachloride ($SiCl_4$), trichloro-silane ($SiCl_3H$), dichlorosilane ($SiCl_2H_2$), monochlorosilane ($SiClH_3$), hexachlorodisilane (HCDS), octachlorotrisilane (OCTS), a silicon iodide, a silicon bromide; or an amino-based precursor, such as hexakis(ethylamino)disilane (AHEAD) and $SiH[N(CH_3)_2]_3$(3DMASi), a bis(dialkylamino)silane, such as BDEAS (bis(diethylamino)silane); a mono(alkylamino)silane, such as di-isopropylaminosilane; or an oxysilane based precursor, such as tetraethoxysilane $Si(OC_2H_5)_4$.

In some cases, the precursor preferentially includes a halogen. It is thought that precursors including a halogen provide for better deposition uniformity of subsequently deposited (e.g., additional) epitaxial layers on a substrate surface.

In some cases, a dilution gas, such as hydrogen, or an inert gas can be provided to the reaction chamber during step 108. Additionally or alternatively, a carrier gas, such as an inert gas, can be provided to the reaction chamber during step 108.

In accordance with further examples of the disclosure, an etchant can be provided to the reaction chamber during step 108. The etchant can be provided from the same source vessel as the precursor or separately provided to the reaction chamber.

Exemplary etchants include halides, such as compounds comprising one or more of fluorine (F), chlorine (Cl), bromine (Br), and iodine (I). By way of examples, the etchant can be or include hydrogen chloride and/or one or more halogen gases, such as $F_2$, $Cl_2$, $Br_2$, and $I_2$.

During step 108, a temperature within the reaction chamber (e.g., of a susceptor and/or reaction chamber wall) can be about 350° C. to about 1050° C., about 400° C. to about 800° C., or about 600° C. to about 800° C., about 850° C. to about 1050° C., about 850° C. to about 950° C., or about 900° C. to about 950° C. A pressure within the reaction chamber can be about 10 Torr to about 1 ATM, about 10 to about 500 Torr, or about 15 Torr to about 200 Torr. A flowrate of the precursor to the reaction chamber can be about 50 sccm to about 1000 sccm, about 100 sccm to about 900 sccm, about 200 sccm to about 700 sccm, about 20 sccm to about 1000 sccm, about 50 sccm to about 900 sccm, or about 50 to 7 about 00 sccm.

A thickness of material deposited during step 108 can vary according to various factors. By way of examples, when the epitaxial material comprises silicon, a thickness of the layer of material on the susceptor can be about 30 to about 5000 Angstroms, about 50 to about 5000 Angstroms, about 50 to about 2000 Angstroms, or about 0.5 to about 20 microns. When the epitaxial material comprises germanium (e.g., silicon germanium), a thickness of the layer of material on the susceptor can be about 10 to about 5000 Angstroms, about 10 to about 1000 Angstroms, about 10 to about 500 Angstroms, about 0.5 microns to about 10 microns, or about 0.5 microns to about 20 microns.

FIG. 2 illustrates an exemplary reactor system 200 in accordance with examples of the disclosure. Reactor system 200 can be used for a variety of applications, such as to perform method 100 and/or to form structure 400, described below. As noted above, one or more steps of method 100 can be performed within a single system (e.g., system 200) and/or within a single reactor or reaction chamber.

In the illustrated example, reactor system 200 includes four separate reactors 202-208, each reactor including a single reaction chamber. In this embodiment, a first substrate handler 214 is used to move substrates (e.g., semiconductor wafers) 226 from one or more cassettes 216-220 to an intermediate loading station 210, 212. Cassettes 216-220 (e.g., Front Opening Unified Pod's (FOUP)) may each hold multiple substrates and engage with loading stations for loading cassettes into the system 200. Subsequently, a second substrate handler 224 is used to move the substrates 226 from intermediate loading station 210, 212 to a reaction chamber of a reactor 202-208. In the system of FIG. 1, four substrates can be processed at a time. However, it will be appreciated that the system may be configured to process more substrates or fewer substrates (e.g., a single substrate). System 200 may further include a gas injection and purge system (not shown) fluidly coupled to the reaction chambers, as well as a heating system (not shown) to elevate temperatures within a reaction chamber and/or the processing stations to a desired processing temperature. Further, the system 200 may include a controller (not shown) configured to control the operation of the system.

FIG. 3 illustrates an exemplary reactor assembly 300 including a reactor 302 suitable for use as any of reactors 202-208. Reactor assembly 300 includes reactor 302 including a reaction chamber 304, a susceptor 306, a gas distribution device 310, gas sources 312, 314, an exhaust source 316, and a controller 318. Although illustrated with reaction chamber 304, reactor 302 can include any suitable number of reaction chambers 304.

Reactor 302 can be configured as a CVD reactor, a cyclical deposition process reactor (e.g., a cyclical CVD reactor), or the like. Reaction chamber 304 can be formed of suitable material, such as quartz, metal, or the like, and can be configured to retain one or more substrates for processing.

Susceptor 306 can support a substrate to be processed. In accordance with examples of the disclosure, susceptor 306 can be or include an electrostatic chuck that supports a substrate during processing. Susceptor 306 can include a heater 308 (e.g., a resistive heater) embedded within susceptor 306.

Gas distribution device 310 provides gas from one or more gas sources 312, 314 to reaction chamber 304.

Gas sources 312, 314 can each include a vessel and a reactant, or precursor, alone or with a carrier or dilution gas stored within the respective vessel. For example, gas sources can include one or more of a haloalkylamine and a halogenated sulfur compound, such as those compounds described herein.

Exhaust source 316 can include, for example, one or more vacuum sources. Exemplary vacuum sources include one or more dry vacuum pumps and/or one or more turbomolecular pumps.

Controller 318 can include electronic circuitry and software to selectively operate valves, manifolds, heaters, pumps and other components included in system assembly 300 and/or system 200. Such circuitry and components can operate to introduce precursors, reactants, and purge gases from the respective sources 312, 314 or other sources. Controller 318 can control timing of gas pulse sequences, temperature of the substrate and/or reaction chamber, pressure within the reaction chamber, and various other operations to provide proper operation of assembly 300. Controller 318 can include control software to electrically or pneumatically control valves to control flow of precursors, reactants and inert gases into and out of the one or more reaction chambers 304. Controller 318 can include modules, such as a software or hardware component, e.g., a FPGA or ASIC, which perform certain tasks. A module can advantageously be configured to reside on the addressable storage medium of the control system and be configured to execute one or more processes. By way of example, controller 318 can be configured to cause assembly 300 to clean a surface of a substrate and optionally form an epitaxial layer, as described herein.

Other configurations of assembly 300 are possible, including different numbers and kinds of precursor and reactant sources and inert gas sources. Further, it will be appreciated that there are many arrangements of valves, conduits, precursor sources, and inert or carrier gas sources that may be used to accomplish a method as described herein. Further, as a schematic representation of an apparatus, many components have been omitted for simplicity of illustration; such components may include, for example, various valves, manifolds, purifiers, heaters, containers, vents, and/or bypasses.

During operation of assembly 300, substrates are transferred from, e.g., a substrate handling system to reaction chamber 304. Once substrate(s) are transferred to reaction chamber 304, one or more gases from gas sources 312, 314, such as precursors, reactants, carrier gases, and/or inert gases, are introduced into reaction chamber 304 to clean a surface of a substrate and optionally form epitaxial material on the cleaned surface.

FIG. 4 illustrates a structure 400 in accordance with examples of the disclosure. Structure 400 includes a substrate 402 and an epitaxial layer 404 formed thereon.

Substrate 402 can include a substrate as described herein. Substrate 402 can include semiconductor material, such as silicon.

Epitaxial layer 404 can include any suitable epitaxial layer. For example, epitaxial layer 404 can include silicon, and can be formed after performing a cleaning/oxide removal process (e.g., steps 102, 104, and optionally 106) as described herein.

Some non-limiting examples of this disclosure are set forth below:

Example 1: A method for selectively removing silicon oxide from a surface of a substrate, the method comprising the steps of:

(a) providing a substrate within a reaction chamber of a reactor system, the substrate comprising a surface comprising silicon oxide; and (b) providing one or more of a haloalkylamine and a halogenated sulfur compound to the reaction chamber to selectively remove the silicon oxide from the surface.

Example 2: The method of example 1, wherein the haloalkylamine comprises an α-fluoroalkylamine.

Example 3: The method of example 2, wherein the α-fluoroalkylamine comprises a compound containing at least one carbon atom bonded to both a nitrogen atom and a fluorine atom.

Example 4: The method of example 2, wherein the α-fluoroalkylamine comprises a compound represented by R2NCF2R', wherein each R is independently selected from a C1-C6 hydrocarbon and R' is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or CF3 or a derivative thereof, and an —NR"2 group, where R" is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or CF3 or a derivative thereof and an —NR'"2 group, where R'" can be selected from a C1-C6 hydrocarbon.

Example 5: The method of example 4, wherein one or more of R and R' comprises a cyclic group.

Example 6: The method of example 5, wherein the cyclic group comprises an $NCF_2$ fragment of the α-fluoroalkylamine.

Example 7: The method of example 2, wherein the α-fluoroalkylamine is 1,1,2,2,-tetrafluoroethyl-N,N-dimethylamine.

Example 8: The method of example 2, wherein the α-fluoroalkylamine is 2,2-difluoro-1,3-dimethylimidazolidine.

Example 9: The method of example 2, wherein the α-fluoroalkylamine is N,N-diethyl-1,1,2,3,3,3-hexafluoro-1-propanamine.

Example 10: The method of example 2, wherein the α-fluoroalkylamine is 2-chloro-N,N-diethyl-1,1,2-trifluoroethanamine.

Example 11: The method of example 1, wherein the haloalkylamine is represented by the formula

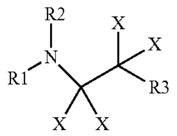

wherein R1 and R2 are each an independently selected C1 to C6 alkyl group or a fluorinated C1 to C6 alkyl group containing one or more fluorine atoms, and wherein R3 is selected from H, F, Cl, a C1-C6 alkyl, or a fluorinated C1-C6 alkyl containing one or more fluorine atoms.

Example 12: The method of example 11, where at least one X is F.

Example 13: The method of example 11, wherein each X is F.

Example 14: The method of example 1, wherein the halogenated sulfur compound comprises a compound represented by the formula $S_aX_b$ where S is sulfur and each X is independently one of F, Cl, Br, or I, where a is a value from 1 to 3, and where b is a value from 2 to 14 and is selected to be within a workable range based on the value of a.

Example 15: The method of example 14, wherein at least one X is F.

Example 16: The method of example 14, wherein each X is F.

Example 17: The method of example 1, wherein the halogenated sulfur compound comprises sulfur, oxygen, and one or more halogens.

Example 18: The method of example 1, wherein the halogenated sulfur compound is represented by the formula $S_aX_bO_c$, where S is sulfur, where O is oxygen, where X is independently F, Cl, Br, I, OH, or an alkyl group containing 1-6 carbon atoms, where at least one X is a halogen atom, where a is a value between 1 and 3, b is a value between 2 and 12, c is a value between 1 and 8, where b and c are selected to be within a workable range based on a, and where c is selected to be within a workable range based on a and b.

Example 19: The method of example 1, wherein the halogenated sulfur compound is selected from one or more of the group consisting of:

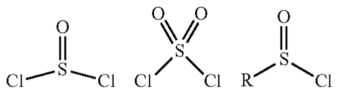

where R is a C1-C6 alkyl group

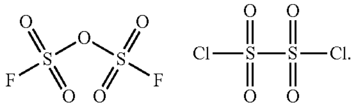

Example 20: The method of example 18, wherein the at least one X is F.

Example 21: The method of example 1, further comprising providing a reactant to the reaction chamber.

Example 22: The method of example 21, wherein the reactant is selected from one or more of the group consisting of water; a C1-C6 alcohol; ammonia; a C1-C6 primary, a secondary, or tertiary amine; a C1-C6 carboxylic acid; and a C1-C6 alkyl hydrazine.

Example 23: The method of example 21, wherein the step of providing the one or more of a haloalkylamine and the halogenated sulfur compound and the step of providing the reactant to the reaction chamber overlap.

Example 24: The method of example 21, wherein the step of providing the one or more of a haloalkylamine and the halogenated sulfur compound and the step of providing the reactant to the reaction chamber alternate and are cyclic.

Example 25: The method of example 1, wherein a pressure within the reaction chamber is between about 10 mTorr and about 760 Torr.

Example 26, The method of example 1, wherein a temperature within the reaction chamber is less than 200° C., less than 150° C., less than 100° C., or less than 50° C.

Example 27: The method of example 1, wherein the method does not include a step of forming a plasma.

Example 28: The method of example 1, further comprising a step of forming an epitaxial layer on the substrate.

Example 29: The method of example 28, wherein the step of forming the epitaxial layer is performed within the reactor system Example 30: The method of example 28, wherein the step of forming the epitaxial layer is performed within the reaction chamber.

Example 31: The method of example 28, wherein the step of forming the epitaxial layer is performed within a separate reaction chamber.

Although exemplary embodiments of the present disclosure are set forth herein, it should be appreciated that the disclosure is not so limited. For example, although the methods are illustrated with steps in a particular order, unless otherwise noted, the methods are not limited to the illustrated step order. Various modifications, variations, and enhancements of methods, systems, and assemblies set forth herein may be made without departing from the spirit and scope of the present disclosure.

The subject matter of the present disclosure includes all novel and nonobvious combinations and subcombinations of the various steps, systems, components, and configurations, and other features, functions, acts, and/or properties disclosed herein, as well as any and all equivalents thereof.

The invention claimed is:

1. A method for selectively removing silicon oxide from a surface of a substrate, the method comprising the steps of:

providing a substrate within a reaction chamber of a reactor system, the substrate comprising a surface comprising silicon oxide; and providing a haloalkylamine to the reaction chamber to selectively remove the silicon oxide from the surface, wherein the haloalkylamine comprises an α-fluoroalkylamine represented by $R_2NCF_2R'$, wherein each R is independently selected from a C1-C6 hydrocarbon and R' is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof, and an —$NR''_2$ group, where R" is selected from a C1-C6 hydrocarbon, a partially fluorinated C1-C6 hydrocarbon, a C1-C6 perfluoroalkyl group, a C6 aryl group that includes 0-5 F and 0-5 alkyl groups, or $CF_3$ or a derivative thereof and an —$NR'''_2$ group, where R''' is selected from a C1-C6 hydrocarbon.

2. The method of claim 1, further comprising providing a halogenated sulfur compound to the reaction chamber.

3. The method of claim 2, wherein the halogenated sulfur compound comprises a compound represented by the formula $S_aX_b$ where S is sulfur and each X is independently one of F, Cl, Br, or I, where a is a value from 1 to 3, and where b is a value from 2 to 14 and is selected to be within a workable range based on the value of a.

4. The method of claim 3, wherein at least one X is F.

5. The method of claim 2, wherein the halogenated sulfur compound comprises sulfur, oxygen, and one or more halogens.

6. The method of claim 2, wherein the halogenated sulfur compound is represented by the formula $S_aX_bO_c$, where S is sulfur, where O is oxygen, where X is independently F, Cl, Br, I, OH, or an alkyl group containing 1-6 carbon atoms, where at least one X is a halogen atom, where a is a value between 1 and 3, b is a value between 2 and 12, c is a value between 1 and 8, where b and c are selected to be within a workable range based on a, and where c is selected to be within a workable range based on a and b.

7. The method of claim 6, wherein the at least one X is F.

8. The method of claim 2, wherein the halogenated sulfur compound is selected from one or more of the group consisting of:

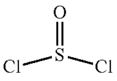 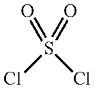 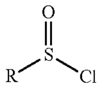

where R is a C1-C6 alkyl group

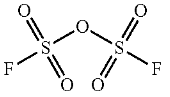 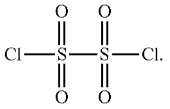

9. The method of claim 1, wherein one or more of R and R' comprises a cyclic group.

10. The method of claim 9, wherein the cyclic group comprises an $NCF_2$ fragment of the α-fluoroalkylamine.

11. The method of claim 1, wherein the α-fluoroalkylamine is at least one of 1,1,2,2,-tetrafluoroethyl-N,N-dimethylamine, 2,2-difluoro-1,3-dimethylimidazolidine, N,N-diethyl-1,1,2,3,3,3-hexafluoro-1-propanamine, and 2-chloro-N,N-diethyl-1,1,2-trifluoroethanamine.

12. The method of claim 1, wherein the haloalkylamine is represented by the formula

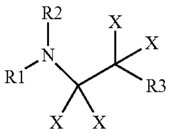

wherein R1 and R2 are each an independently selected C1 to C6 alkyl group or a fluorinated C1 to C6 alkyl group containing one or more fluorine atoms, and wherein R3 is selected from H, F, C1, a C1-C6 alkyl, or a fluorinated C1-C6 alkyl containing one or more fluorine atoms, and wherein each X is F.

13. The method of claim 1, further comprising providing a reactant to the reaction chamber.

14. The method of claim 13, wherein the reactant is selected from one or more of the group consisting of water; a C1-C6 alcohol; ammonia; a C1-C6 primary, a secondary, or tertiary amine; a C1-C6 carboxylic acid; and a C1-C6 alkyl hydrazine.

15. The method of claim 13, wherein the step of providing the haloalkylamine and the step of providing the reactant to the reaction chamber overlap.

16. The method of claim 13, wherein the step of providing the haloalkylamine and the step of providing the reactant to the reaction chamber alternate and are cyclic.

17. The method of claim 1, wherein the method does not include a step of forming a plasma.

* * * * *